Figure 1:
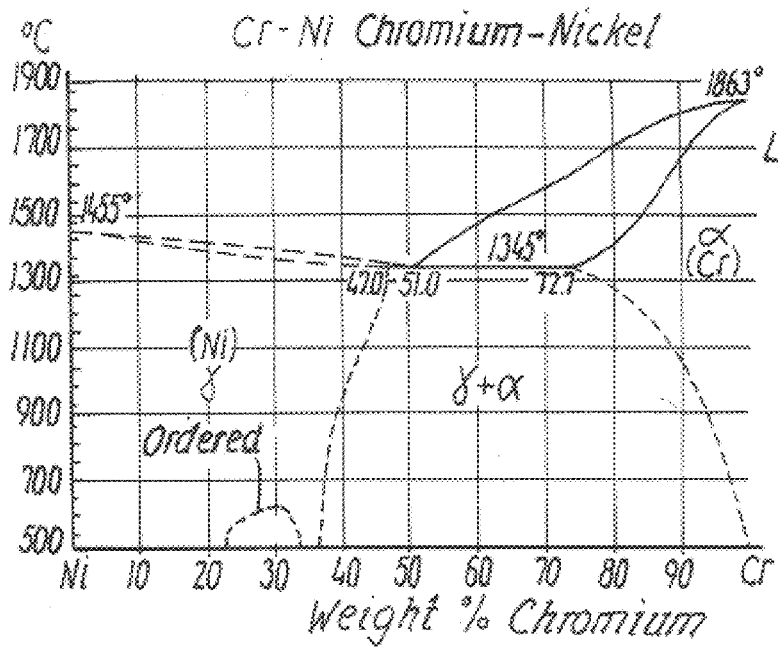

United States Patent [19]
Hoeg

[11] Patent Number: 5,958,332
[45] Date of Patent: Sep. 28, 1999

[54] CYLINDER MEMBER AND NICKEL-BASED FACING ALLOYS

[75] Inventor: Harro Andreas Hoeg, Allerød, Denmark

[73] Assignee: MAN B&W Diesel A/S, Copenhagen SV, Denmark

[21] Appl. No.: 08/873,246

[22] Filed: Jun. 11, 1997

[51] Int. Cl.[6] .................................................. C22C 19/05
[52] U.S. Cl. ...................................... 420/442; 123/188.3
[58] Field of Search ............................... 123/193.6, 193.5, 123/188.3; 420/442, 452, 453, 454

[56] References Cited

U.S. PATENT DOCUMENTS

| | | | |
|---|---|---|---|
| 4,769,094 | 9/1988 | Park et al. | 420/442 |
| 4,810,467 | 3/1989 | Wood et al. | 420/448 |
| 4,844,864 | 7/1989 | Frank | 420/447 |
| 4,997,623 | 3/1991 | Brill | 420/453 |
| 5,131,961 | 7/1992 | Sato et al. | 420/448 |
| 5,495,837 | 3/1996 | Mitsuhashi et al. | 123/188.3 |
| 5,556,594 | 9/1996 | Frank et al. | 420/448 |
| 5,753,177 | 5/1998 | Morinaga et al. | 420/453 |
| 5,778,534 | 7/1998 | Kim | 123/188.3 |

FOREIGN PATENT DOCUMENTS

| | | |
|---|---|---|
| 165125 | 8/1986 | Denmark . |
| 0 521 821 A2 | 1/1993 | European Pat. Off. . |
| 0 529 208 A1 | 3/1993 | European Pat. Off. . |
| 24 46 517 A1 | 4/1976 | Germany . |
| 27 05 344 A1 | 8/1977 | Germany . |
| 30 18 007 A1 | 11/1981 | Germany . |
| 29 40 970 C2 | 3/1988 | Germany . |
| 64-52050 | 2/1989 | Japan . |
| 422 338 | 3/1982 | Sweden . |
| WO 92/13179 | 8/1992 | WIPO . |

OTHER PUBLICATIONS

Chemical Abstracts of Japan, vol. 117, No. 4, Jul. 27, 1992, p. 352 (JP 3287736) (w/full English translation of Japanese application).

Kingston–Jones, et al., "Review of Operating Experience with Current Valve Materials," *Diesel Engine Combustion Chamber Materials for Heavy Fuel Operation*, London, 1990, pp. 15–28.

*Primary Examiner*—John T. Kwon
*Attorney, Agent, or Firm*—Sughrue, Mion, Zinn, Macpeak & Seas, PLLC

[57] ABSTRACT

A cylinder member for an internal combustion engine such as a valve, piston, cylinder liner or seat portion. The member has a welded high temperature corrosion resistant facing alloy with a hardness increased by use of a precipitation hardening mechanism based on a solid state phase transformation. The facing alloy has a temperature of activation of the precipitation hardening mechanism that is above the operating temperature of the alloy. The participation hardening mechanism acts so slowly that the alloy has not hardened at welding on the cylinder member Hardening occurs during a subsequent heat treatment at a temperature higher than the activation temperature for the participation hardening mechanism.

22 Claims, 12 Drawing Sheets

48% Cr/Ni bal

48% Cr/Ni bal. + 0,06 % B.

48 % Cr/Ni bal. + 0,12 % B.

48% Cr/Ni bal. + 0,23% B.

48% Cr/Ni bal. + 0,4% B.

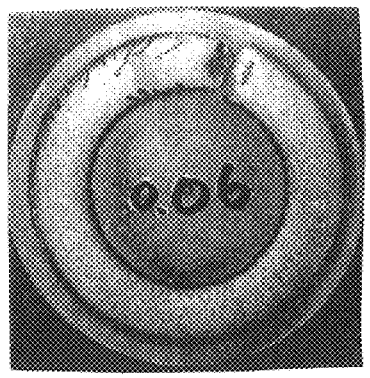 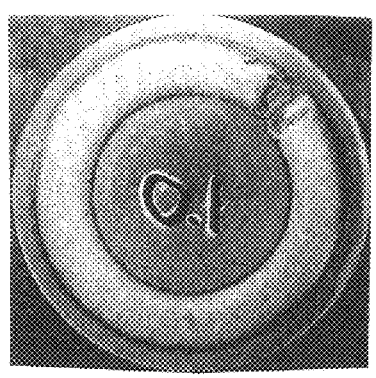 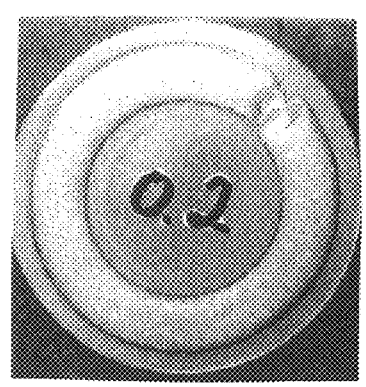
48% Cr/Ni bal.+0,06%B, 0,09%Si.        48% Cr/Ni bal.+0,11%B, 0,17%Si.        48% Cr/Ni bal.+0,21%B, 0,33%Si.
*FIG. 7*                               *FIG. 8*                               *FIG. 9*

48% Cr/Ni bal.　　　　48% Cr/Ni bal. + 0,06% B.　　　　48% Cr/Ni bal. + 0,12% B.

48% Cr/Ni bal. + 0,23% B.    48% Cr/Ni bal. + 0,4% B.    48% Cr/Ni bal. + 0,06% B, 0,09 Si.

48%Cr/Ni bal.+ 0,11%B, 0,17%Si.   48%Cr/Ni bal.+ 0,21%B, 0,33%Si.

43% Cr/Ni bal.　　　　43% Cr/Ni bal. + 0,15% B.　　　43% Cr/Ni bal. + 0,2% B.

43% Cr/Ni bal. + 0,3% B.

43% Cr/Ni bal. + 0,4% B.

43% Cr/Ni bal. + 0,5% B.

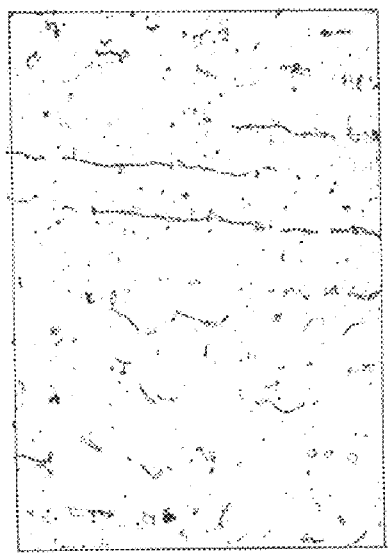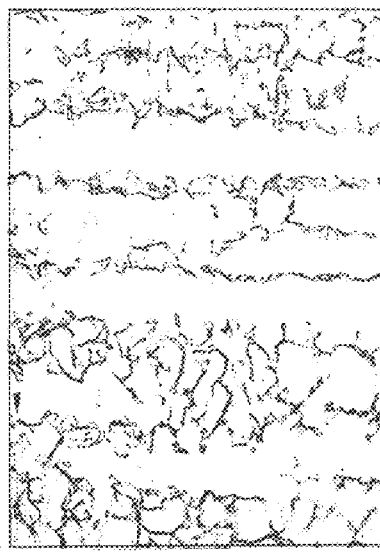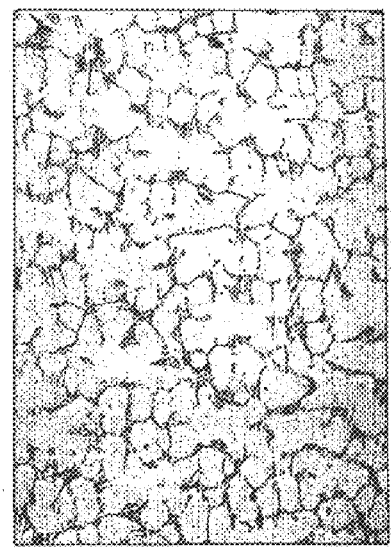
43% Cr/Ni bal      43% Cr/Ni bal. + 0,15% B      43% Cr/Ni bal. + 0,2 B
FIG. 24            FIG. 25                       FIG. 26

43% Cr/Ni bal. + 0,3% B.  43% Cr/Ni bal. + 0,4% B.  43% Cr/Ni bal. + 0,5% B.

CYLINDER MEMBER AND NICKEL-BASED FACING ALLOYS

The invention relates to a cylinder member, such as a valve, a seat portion, a piston or a cylinder liner, in an internal combustion engine, particularly a large two-stroke crosshead engine, which member is provided with a welded high-temperature corrosion-resistant facing alloy, and relates to a nickel-based facing alloy which may, for example, be welded on to such a cylinder member.

A number of different facing alloys for exhaust valves in internal combustion engines are known. WO92/13179 describes, for example, the use of the nickel-based alloy, Alloy 50, the cobalt-based alloy, Stellite 6, and a nickel-based alloy, the most important alloy components of which are 20–24% Cr, 0.2–0.55% C and 4–7% Al.

EP-A-0 521 821 describes a valve made of Nimonic provided with a welded layer of Inconel 625, or provided in a manner not further explained with a layer of Inconel 671 which, apart from unavoidable impurities, consists of 0.04–0.05% C, 47–49% Cr, 0.3–0.40%.Ti and the balance Ni. It is mentioned that the alloy Inconel 671 does not provide a corrosion resistance as good as that of Inconel 625, which contains among other things 20–22% Cr, 8.0–9.5% Mo, 3.15–4.15% Nb+Ta and the balance Ni.

DT-OS 24 46 517 describes a facing alloy for nuclear reactors, attempting to avoid intercrystalline corrosion by means of a welding alloy consisting of maximum 0.05% C, 1.0–5.0% Si, maximum 1.0% Mn, 20–50% Cr, 0.5–3.0% B, maximum 3.0% Cu, maximum 5.0% Fe and the balance Ni, where % Cr $\geq 10\times\%$ B+13. Concrete examples mention alloys with a B content ranging from 1.13 to 2.86%.

SE-B-422 338 describes a valve for an internal combustion engine having a basic body of a chromium-containing nickel alloy which is coated with a chromium-containing cobalt alloy at a temperature exceeding 3000° C., whereupon the member is subjected to mechanical machining and ageing at a temperature higher than the working temperature, the aim of which is to stabilize the structure and dimensions of the alloy and counteract intercrystalline corrosion.

DK-B-165125 describes an exhaust valve for an internal combustion engine with a high-temperature corrosion-resistant facing alloy comprising 13–17% Cr, 2–6% Al, 0.1–8% Mo, 1.5–3.5% B, 0.5–3%; Ti, 4–7% Co and the balance Ni.

A number of other facing alloys for exhaust valves in internal combustion engines are known from the article "Review of operating experience with current valve materials", published in 1990 in the book "Diesel engine combustion chamber materials for heavy fuel operation" from The Institute of Marine Engineers, London.

The purpose of the known facings on valves is, among other things, to provide a surface on the member with excellent high-temperature corrosion resistance so that the material is not corroded by the highly corroding environment in a heavy fuel oil diesel engine, and in case of seat areas, a surface of high hardness so that the formation of dent marks is counteracted, and at the same time the material deposited should have a high ductility counteracting the formation of cold cracks in the material.

In the known valve alloys, the hardness of the facing has mainly been provided by precipitation of carbide networks, borides and/or intermetals, such as $Ni_3Al$ ($\gamma'$), $\mu$-phase, $\sigma$-phase or Laves-phase in the basic matrix of the alloy, and by solution hardening. The known welded facing alloys are very exposed to cold cracking in the welding material at the cooling of the member following welding, viz. cracks present immediately following the conclusion of welding. The cold cracks require either rejection or repair of the members with the welded facing. The problem of cold cracking is particularly pronounced in the known boron-containing facing alloys, because these known alloys have very low ductility. B is here used for precipitation of borides to increase the hardness and abrasion resistance of the alloy.

In the case of cast members, to achieve good high-temperature corrosion resistance, particularly in environments containing sulphur and vanadium from heavy fuel oil combustion products, it is known to use an alloy of the type 50% Cr 50% Ni or an alloy of the type IN 657, consisting of 48–52% Cr, 1.4–1.7% Nb, maximum 0.1% C, maximum 0.16% Ni, maximum 0.2% C+N, maximum 0.5% Si, maximum 1.0% Fe, maximum 0.3% Mg and the balance Ni. After casting, the alloy comprises a nickel-rich $\gamma$-phase and a chromium-rich $\alpha$-phase where both phases, depending on the precise analysis of the alloy, may constitute the primary dendrite structure. It is known that these alloys age-harden at operating temperatures exceeding 700° C., which causes embrittlement characterized in a ductility of less than 4% at room temperature. Owing to these relatively poor strength properties, the alloys have exclusively been used for cast members with no special requirements as to strength.

EP-A-0529208 describes a chromium-based hardfacing alloy for welding in the valve seat area on the valves in a car engine. The alloy contains 30–48% Ni, 1.5–15% W and/or 1.0–6.5% Mo, and the balance is of at least 40% Cr. The welding is performed by means of laser welding, and at the cooling of the solidified chromium-containing $\alpha$-phase, a nickel-containing phase is precipitated. W and Mo have a solution enhancing effect on the alloy and contribute vitally to its strength. C can be added in amounts of 0.3–2.0% to increase the hardness by formation of carbides, and B can be added in amounts of 0.1–1.5% to increase the hardness by formation of chromium borides. Nb can be added in amounts of 1.0–4.0% to form hardness-increasing intermetallic compounds as well as carbides and borides. The hardness of the alloy is thus created immediately upon welding by precipitation of carbide networks, borides and/or intermetals in the chromium-containing basic matrix of the alloy and by solution hardening like in the above alloys. Consequently, great care and special welding methods must be applied, such as laser welding, to avoid cracking in immediate connection with the welding process. Welding on large members, such as cylinder members for large marine engines, where a valve may, for example, have a disc diameter of 300–500 mm, is hardly commercially feasible with this known alloy.

The object of the invention is to provide a cylinder member and a facing alloy which have a high resistance to hot corrosion in the environment existing in the working chamber of an internal combustion engine, while at the same time the risk of cracking in connection with welding is substantially lower than in the known alloys so that welding methods with a suitably high melting rate can be used to weld the alloy on to large members on a commercial basis.

In view of this object, the cylinder member according to the invention is characterized in that the hardness of the welded alloy is increased by means of a precipitation hardening mechanism based on a solid-state phase transformation, that the temperature of activating the precipitation hardening mechanism is above the operating temperature of the alloy, and that the precipitation hardening mechanism acts so slowly that the alloy substantially does not harden at welding on the cylinder member, but hardens during a subsequent heat treatment at a temperature higher than the activation temperature for the precipitation hardening mechanism.

By primarily inducing the hardness of the alloy by a solid-state phase transformation through heat treatment of the material after solidification of the welded facing alloy, the desired hardness has been achieved with a substantially smaller precipitation of eutectics and hard phases during solidification than in the known alloys. This strengthens the mutual bonds between the primary dendritic precipitates, which counteracts hot cracking.

Cold cracking immediately following welding has been elegantly avoided, as the slow-acting hardening mechanism only increases the hardness of the alloy at the subsequent heat treatment after the alloy has been stress-relieved, as will be explained in detail below. Until the member is heat-treated after finished mechanical machining, the welded facing alloy retains a high ductility of, for example, 25%, which prevents the residual stresses after welding corresponding to the yield stress of the alloy from generating cracks. The yield stress of facing alloys of the type mentioned here increases with the increasing hardness of the alloy, just as the temperature for achieving stress relieving also increases. During heating to the activation temperature for the hardening mechanism, the welded, still very ductile alloy becomes exposed to a temperature level which releases the residual stresses by means of stress relieving. The low hardness of the alloy before hardening causes the stresses to be relieved. quickly and at a low temperature.

To achieve a solid-state phase transformation the composition of the alloy must be chosen so that in the area around the chosen analysis, the main elements of the alloy depicted in a phase diagram exhibit an oblique dividing line for the state of equilibrium between two different phase areas, where, for example, one phase area may contain the crystal lattice form, BCC (Body Centered Cubic), and the other a mixture of BCC and the so-called FFC form (Face Centred Cubic). As another example may be mentioned two FCC forms with mutually deviating side lengths. At the rapid solidification of the weld pool and the subsequent cooling the alloy does not have time to adjust itself to the state of equilibrium, i.e., judged in relation to the state of equilibrium the alloy will have too large a proportion of one phase. At the subsequent heating above the hardening temperature, the underrepresented phase will be point-precipitated in the overrepresented phase, which generates internal stresses with crystal distortions preventing dislocations from travelling through the crystal grains, whereby the alloy achieves high hardness. The transformation from one to the other phase takes place through diffusion of the alloy components, and extremely small point precipitates occur which are so finely distributed that the resulting alloy has a very uniform microhardness. Such solid-state phase transformations are in themselves known from other alloys, but the feature of importance to the invention is that for the chosen analysis of the facing alloy, the transformation takes so long that it does not become active in the period passing until the just welded material has cooled below the hardening temperature. As the welded material retains high ductility until hardening, the cylinder member may without problems be exposed to mechanical machining to the finished geometry, whereupon hardening is performed.

The cylinder member is preferably provided with a facing alloy which solidifies on welding primarily in an austenitic phase, part of which becomes transformed into a ferritic phase at temperatures above the activation temperature for the precipitation hardening mechanism. This precipitation of the ferritic BCC form in the austenitic FCC form is advantageous for achieving high hardness and is extremely suitable in connection with facing alloys which normally contain nickel and chromium, as the binary Cr-Ni phase diagram has a characteristic, slightly S-shaped dividing line between the austenitic nickel-rich phase and the more chromium-rich phase area.

The activation temperature for precipitation hardening of the alloy may suitably be in the interval from 550 to 1100° C., preferably from 700 to 850° C., and at the same time activation of the precipitation hardening mechanism requires said activation temperature to be exceeded. for more than 40 s, suitably for more than 20 min. With such a hardening mechanism, the facing alloy of the cylinder member is especially adapted to the welding methods which have a melting rate advantageously high for the manufacture of the members, and to the operating temperatures occurring in cylinder members in a large two-stroke crosshead engine. If the cylinder members are to be used in smaller engines, other temperature levels may be chosen.

Preferably, expressed in percentage by weight and apart from commonly occurring impurities, the facing alloy of the cylinder member comprises from 40 to 51% Cr, from 0 to 0.1% C, less than 1.0% Si, from 0 to 5.0% Mn, less than 1.0% Mo, from 0.05 to less than 0.5% B, from 0 to 1.0% Al, from 0 to 1.5% Ti, from 0 to 0.2% Zr, from 0.5 to 3.0% Nb, an aggregate content of Co and Fe of maximum 5.0%, maximum 0.2% O, maximum 0.3% N and the balance Ni.

In a well-known manner, the large content of Cr promotes the corrosion properties of the nickel alloy in the relevant operating environment. The welded alloy has better corrosion properties and higher hardness at the operating temperatures from 500 to 700° C. than the known hardfacings on cylinder members, and better mechanical properties than the above cast nickel alloys. Outside of the interval stated for the Cr content, the solid phase transformation cannot be achieved in a suitable manner, as the activation temperature becomes too low when the lower Cr interval limit is not reached, and if the upper Cr interval limit is exceeded, the solidification interval of the alloy is increased, and primarily ferrite may be precipitated in a hard and brittle phase resulting in an undesired fall in ductility. The amounts of the other alloy components determine the precise positioning of the dividing line in the phase diagram between the two relevant phases, which means that the optimum content of Cr can be adjusted finely by tests to achieve the desired activation temperature for the hardening when the other alloy components are known.

The content of B has surprisingly turned out to be decisive for the weldability of the nickel alloy with the high Cr content. Already at such a small amount as 0.05%, B causes the solidification of the melt to change from cellular solidification into dendritic solidification, where the dendritic branches interlock and produce a geometrical locking of the structural components so as to avoid more extended and plane film layers in the melt which is the last to solidify. Thus, the content of B contributes substantially to the high resistance of the alloy to hot cracking at welding. B is largely insoluble in the $\gamma$ and $\alpha$-phases, and it is presumed that the solidification involves a eutectic with a number of borides. At a B content of 0.5% and upwards, the amount of eutectic and associated borides increases to a level with is destructive to the desired ductility of the alloy. A large content of B may also cause precipitation of the well-known and undesired low-melting eutectics of no great strength.

Nb influences the solid phase transformation to provide globular precipitation rather than lamellar precipitation, which increases the ductility of the alloy remaining after heat treatment. This is of is importance particularly to cylinder members which are exposed to mechanical influences during operation. A corresponding effect can be achieved with Ta, Ti and Zr, but Ta is very expensive, and more than 1.5% Ti may cause intermetallic precipitation making the alloy harden partially and embrittle at the welding, and a content of Zr exceeding 0.2% may cause hot cracking at welding.

A content of Mo of less than 1.0% may contribute to strengthen the austenitic phase through a solution-enhancing effect which gives the alloy greater tensile strength.

Si, Mn and Al have a de-oxidizing effect at welding and are therefore, to avoid welding defects, desirable as components in the filler material used at welding. Although some of the de-oxidising agent is burned away at welding, part of it will remain in the finished alloy. It is desired to limit Si to less than 1%, as Si reduces the desired effect of B and necessitates a larger addition thereof. Mn is not quite such an efficient de-oxidizing agent, and it is desired to limit the amount to maximum 5% so as not to dilute the active components in the finished alloy. An Al content of more than 1% may cause undesired precipitation of the intermetallic phase $Ni_3Al$, which increases the hardness of the nickel matrix already during the welding process.

C is a common impurity in commercial alloys, and it is expensive to remove C completely. The C content should be limited to maximum 0.1% to avoid or reduce carbide formations. O and N will normally be deposited in the alloy from the ambient air, but they do not contribute to the desired properties.

Co and Fe are also impurities which it is desired to limit to an aggregate content of maximum 5%.

The invention also relates to a nickel-based facing alloy which is characterized according to the invention in that expressed in percentage by weight and apart from commonly occurring impurities, it comprises from 40 to 51% Cr, from 0 to 0.1% C, less than 1.0% Si, from 0 to 5.0% Mn, less than 1.0% Mo, from 0.05 to less than 0.5% B, from 0 to 1.0% Al, from 0 to 1.5 Ti, from 0 to 0.2% Zr, from 0.5 to 3.0% Nb, an aggregate content of Co and Fe of maximum 5.0%, maximum 0.2% O, maximum 0.3% N and the balance Ni. As described above, this alloy is distinguished by very good high-temperature corrosion resistance and by being weldable largely without any risk of cracking and by being heat-treatable to high hardness at temperatures of, for example, 650–800° C. with retention of a ductility which permits the use of the alloy on mechanically loaded members as a protective facing and/or a hard facing. The influence of the individual components on the properties of the alloy are mentioned above.

With a view to ensure high ductility of the alloy immediately following welding, preferably the content of Al is maximum 0.1%, and the content of Ti is preferably maximum 0.1%. Such low contents of Al and Ti suppress precipitation during welding of the hardness-increasing and thus ductility-lowering intermetallic phase $Ni_3Al$ (Ti).

The Cr content of the alloy may suitably be in the interval from 45 to 50%. A Cr content of minimum 45% provides the advantage that the precipitation hardening mechanism takes place in a more controlled manner and at a higher activation temperature, which means partly that the alloy at welding is cooled quickly below the activation temperature, partly that the subsequent machining of the member to the final geometry can take place largely without taking into consideration the heating of the member by the machining. The upper limit of 50% provides suitable certainty against formation of the hard and brittle primary ferrite phase.

In a preferred embodiment, the alloy contains from 0.15 to 0.40% B, preferably maximum 0.25% B. The upper limit of 0.4% B provides suitable certainty that hardness-increasing borides are not precipitated in too large amounts when the alloy solidifies, and the lower limit of 0.15% ensures that at the dilution of the welding metal with the basic material of the member, the boron content does not in local areas become so low that hot cracks can easily arise. The ability of boron to produce the desired dendritic structure in the alloy is reduced at a falling Cr content in the alloy. At a Cr content of less than 45%, the content of B is therefore preferably from 0.20 to 0.30%. The preferred upper limit of 0.25% is suitable in alloys with at least 45% Cr.

To avoid incorporating larger amounts of B into the alloy, the content of Si in the welded alloy is preferably maximum 0.03%, and because, as mentioned, the content of Mn has a diluting effect, the Mn content may suitably be restricted to maximum 0.5%. For the same reason a content of Mo of maximum 0.5% is preferred, and/or an aggregate content of Co and Fe of maximum 1.0% and maximum 0.02% O and maximum 0.02% N.

The advantageous change in the hardening mechanism to take place with globular precipitation is strengthened if the content of Nb is at minimum 1.0%, and for economic reasons the content of the relatively costly Nb may suitably be limited to 2.0%, as a higher content of Nb usually does not substantially improve the properties of the alloy. The risk of hot cracks at welding may suitably be limited by incorporating maximum 0.02% Zr in the alloy.

Figure 2:
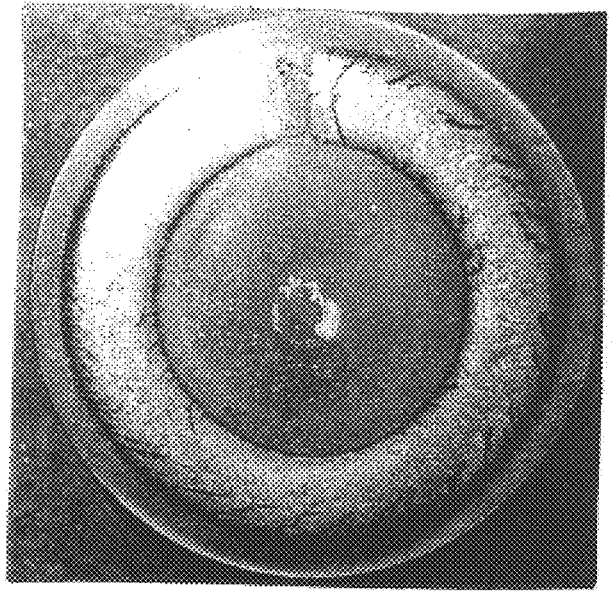
Figure 3:
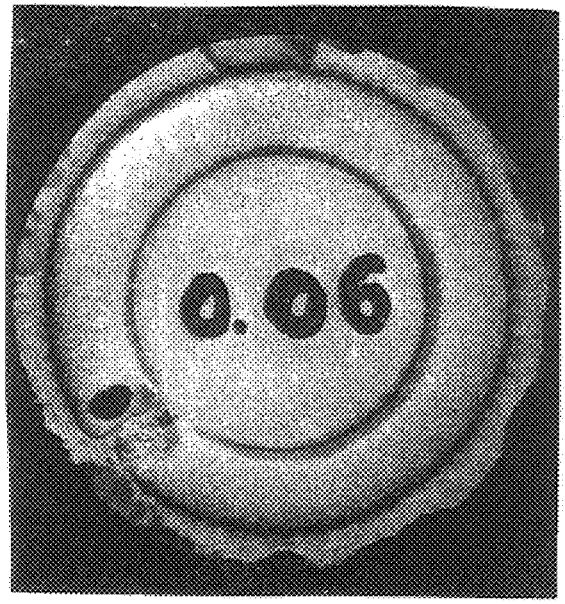
Figure 4:
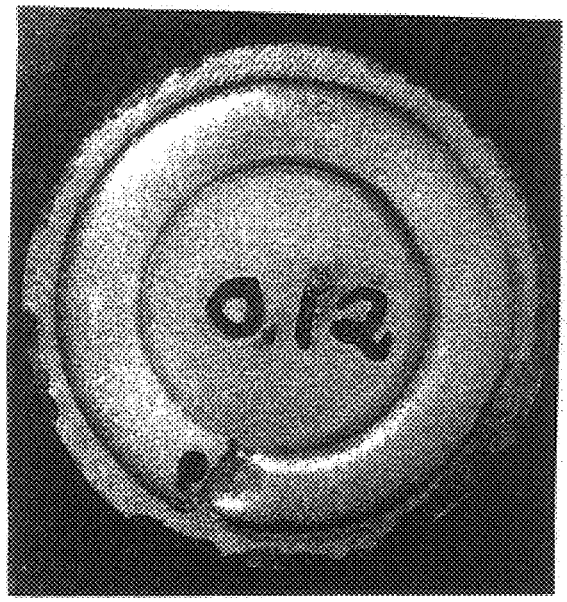
Figure 5:
Figure 6:
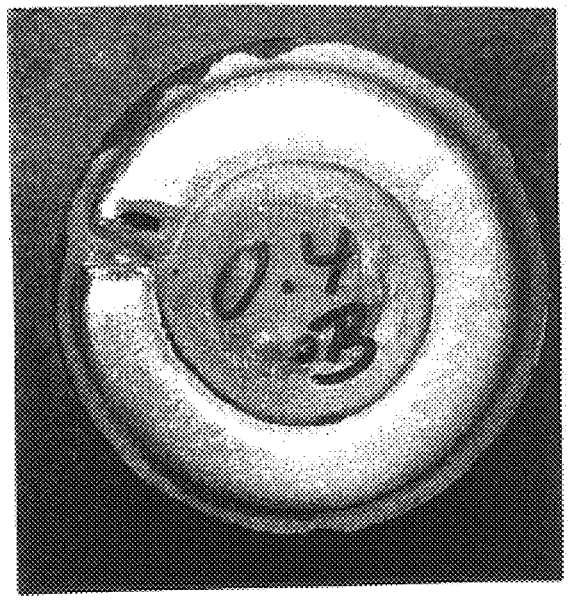
Figure 10:
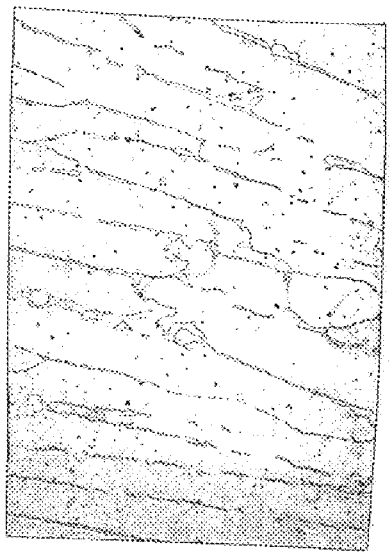
Figure 18:
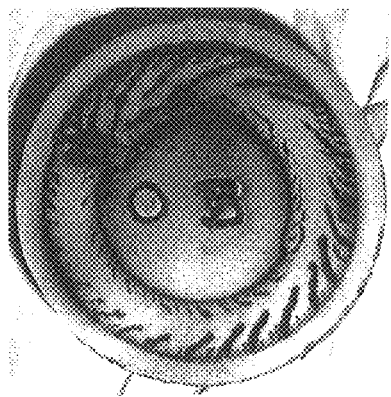
Figure 19:
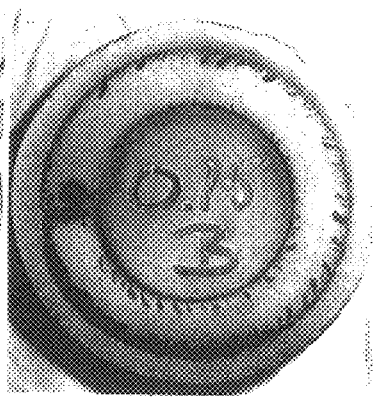
Figure 20:
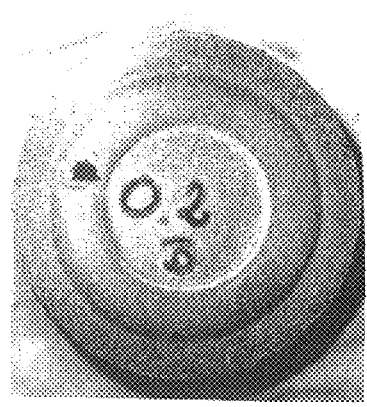
Figure 21:
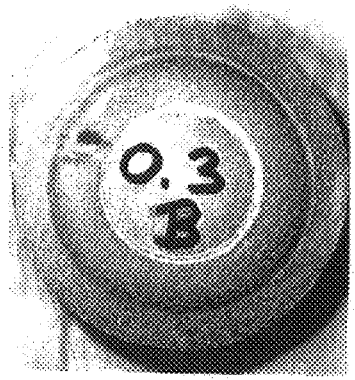
Figure 22:
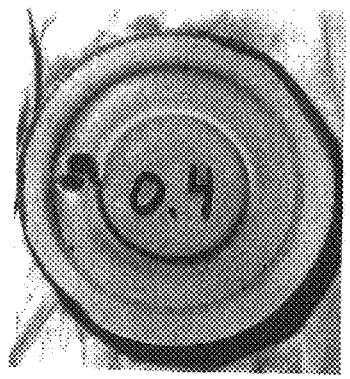
Figure 23:
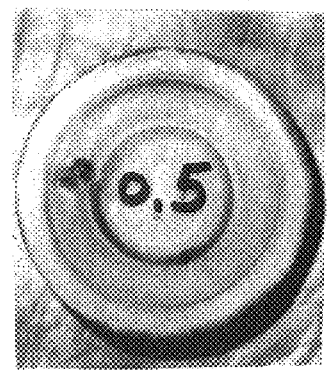
Figure 27:
Figure 28:
Figure 29:
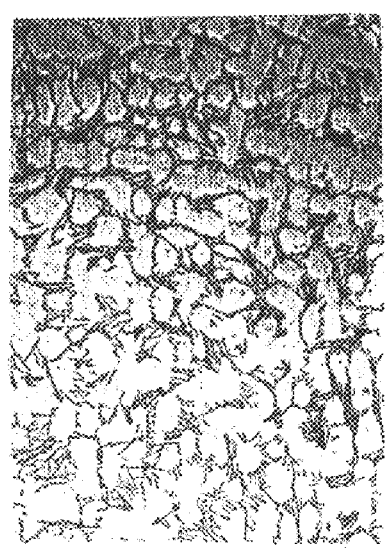
Figure 30:
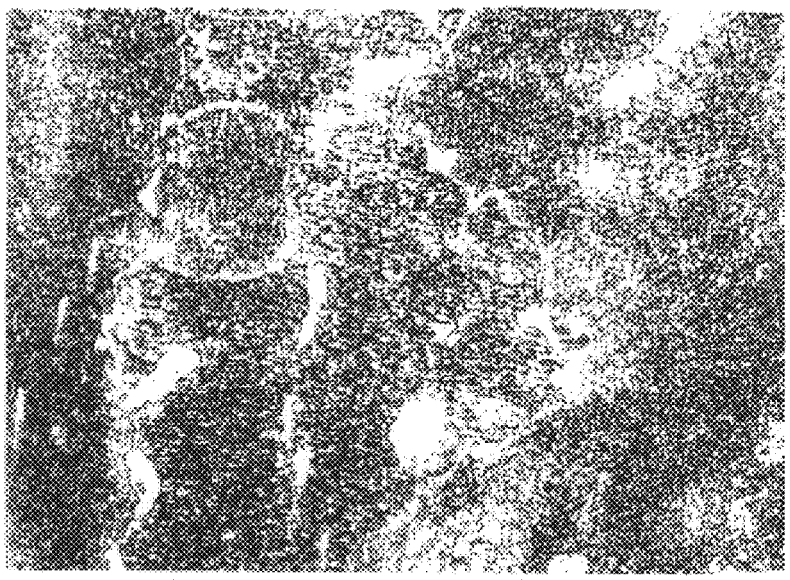
Figure 31:
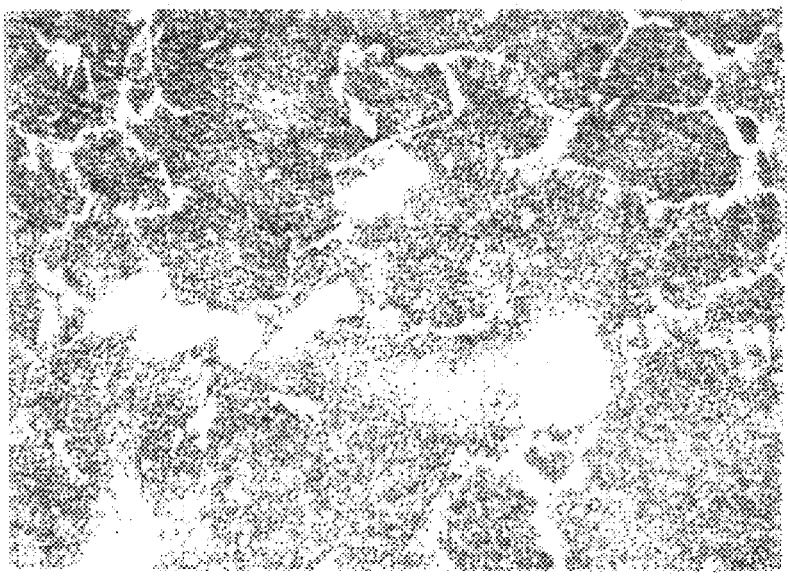
Figure 32:
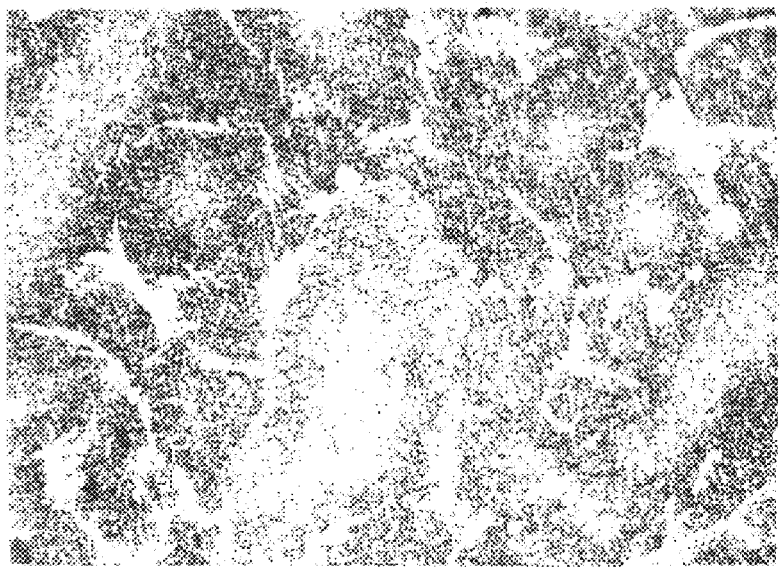

Now, examples of the alloys of the invention will be described in detail below with reference to the drawing, in which FIG. 1 shows a phase diagram for the binary Cr-Ni system, FIGS. 2 and 10 are photographs of a penetrant test and a ground and polished specimen magnified 500 times of a reference alloy with 48% Cr and the balance Ni, FIGS. 3–6 and 11–14 are corresponding photos showing the influence of boron on the weldability of the alloy, FIGS. 7–9 and 15–17 are corresponding photos showing the influence of silicon on the weldability of the alloy, FIGS. 18 and 24 are corresponding photos of a reference alloy with 43% Cr and the balance Ni, FIGS. 19–23 and 25–29 are corresponding photos of the influence of boron on the weldability of this alloy, and FIGS. 30–32 are photos of ground and polished samples magnified 1000 times of three alloys according to the invention.

The binary phase diagram shown in FIG. 1 shows the slightly S-shaped dividing line between the equilibrium phases γ and γ-α. The dividing line starts at a temperature of about 1345° C. from a point at about 47% Cr and extends obliquely downwards to a point at about 38% Cr at a temperature of 500° C. When an Ni-Cr alloy in the above area is welded, the solidification of the weld pool and the subsequent cooling will take place so rapidly that mainly austenitic nickel phase γ is formed. At the subsequent hardening, the ferritic α-phase will be precipitated in the nickel phase as very finely distributed globular precipitates. For an alloy with further alloy components, the exact position of the dividing line depends on the type and amount of all alloy components.

As the weldability of the alloys is a substantial characteristic of the invention, a number of tests have been made to see how weldability is affected by the addition of B and de-oxidizing components exemplified by Si. The tests were carried out with Plasma Transferred Arc Welding (PTAW) on unalloyed steel discs of a diameter of 135 mm and a thickness of 30 mm. The welding parameters were an arc voltage of 30 V and a current intensity of 160 A. The welding speed was 60 mm/minute, and the melting rate was 1.6 kg/hour. The welded members were coated with a red-colouring penetrant liquid which was left in any cracks in the welded material after wiping of the member, which render possible a visual check for cracking. A sample was taken from each member and ground and polished as well as photographed in a microscope. The results of the tests are shown in the drawing.

Figure 11:
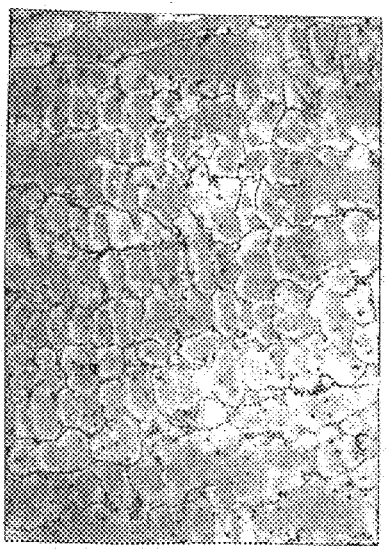
Figure 12:
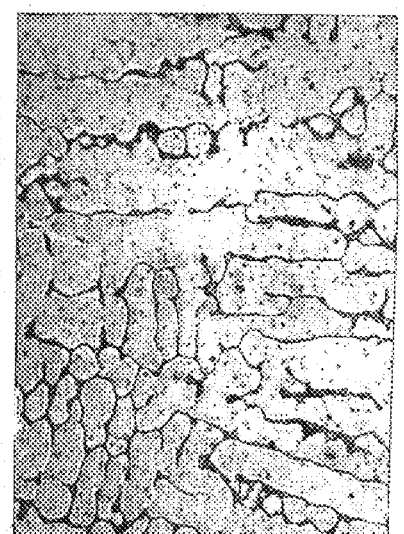
Figure 13:
Figure 14:
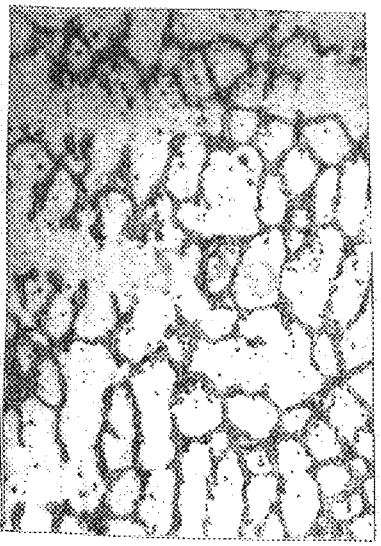
Figure 15:
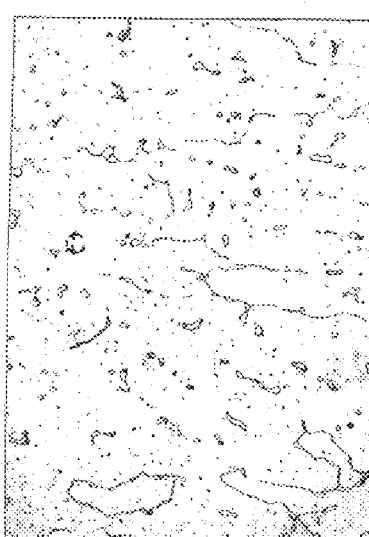
Figure 16:
Figure 17:
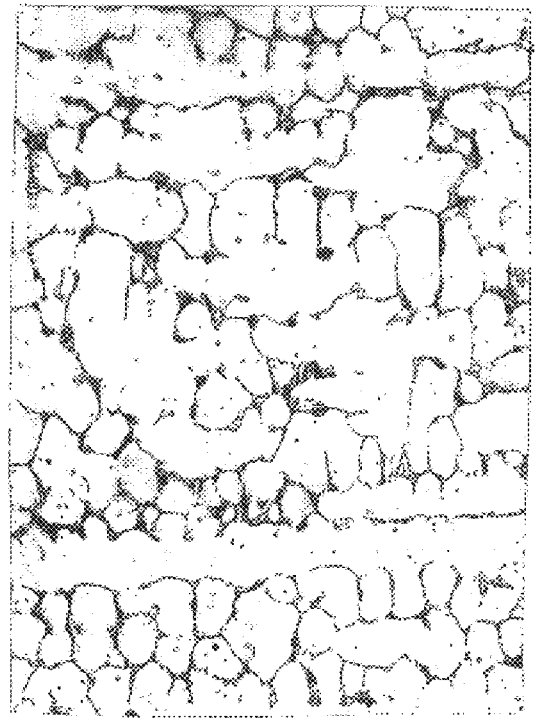

Nickel alloys with a high content of Cr have so far been considered very difficult to weld owing to the high risk of hot cracking, which was confirmed at the two reference tests. In FIGS. 2 and 11, the well-known strong cracking due to hot cracking is seen. FIGS. 10 and 24 show that solidification has taken place cellularly with the dark extended plane film layers between the crystal grains.

The marked influence of boron on hot cracking appears from FIGS. 3–6 and FIGS. 19–23. In the alloys with 48% Cr and a content of B of 0.06%, 0.12%, 0.23% and 0.40%, respectively, it can be seen that the long hot cracks have disappeared already at the addition of as little as 0.06% B, and the sample with 0.4% B was completely crackfree. The alloys with 43% Cr and a content of B of 0.15%, 0.2%, 0.3%, 0.4% and 0.5% B, respectively, show a drastic shortening of the hot cracks at 0.15% B, but the hot cracks were only completely gone at 0.2% B, which means that the alloy has to have a larger content of B when the Cr content is lower. FIGS. 11–14 show that B makes the alloy solidify in a dendritic structure. The same effect is indicated in FIG. 25, but only fully achieved in FIG. 26.

FIGS. 7–9 and 15–17 show alloys with an addition of Si in amounts of 0.09%, 0.17%, and 0.33%, respectively, and with an associated content of B of 0.06%, 0.11% and 0.21%, respectively. It can be seen that Si reduces the ability of B to produce a dendritic solidification structure.

EXAMPLE 1

An alloy according to the invention was prepared, having the following analysis: 48.6% Cr, 1/5% Nb, 0.67% Mn, 0.39% Si, 0.1% B, 0.012% C and the balance Ni. The alloy was welded on to a member in the same manner as mentioned above, only two weld beads were applied on top of each other. No cracking could be observed after the welding. After welding, the hardness of the alloy at 20° C. was measured to 200 HV20. The member was then heat-treated for 72 hours at a temperature of 700° C. After the heat treatment no cracking could be observed either. By means of the measuring method HBW 3000/15/10, the hardness of the alloy was measured to 511 HV20 and 460 HBW at 20° C. and 415 HBW at 500° C., which shows that the alloy retains an extremely advantageous, high hardness at a high temperature. The sample was cut, ground and polished in the usual manner. FIG. 30 shows a photo of the alloy, and it can be seen immediately that the structure of the hardened alloy is so fine that the individual structural components can hardly be distinguished despite the powerful magnification.

EXAMPLE 2

Corresponding tests were made as above with an alloy of the following analysis: 48.6% Cr, 0.5% Nb, 0.67% Mn, 0.39% Si, 0.1% B, 0.012% C, 0.24% Co+Fe and the balance Ni. No cracking could be observed, either before or after the heat treatment. Before heat treatment, the hardness was measured to 220 HV20 and after heat treatment to 551 HV20 and 460 HBW at 20° C. and 415 HBW at 500° C. A photo of the alloy is shown in FIG. 31.

EXAMPLE 3

Corresponding tests were made as above with an alloy of the following analysis: 48.6% Cr, 1.5% Nb, 0.67% Mn, 0.39% Si, 0.1% B, 0.012% C, 0.24% Co+Fe and the balance Ni. No cracking could be observed, either before or after the heat treatment. Before heat treatment, the hardness was measured to 210 HV20 and after heat treatment to 467 HV20 and 451 HBW at 20° C. and 401 HBW at 500° C. A photo of the alloy is shown in FIG. 32. The examples show the very low hardness and consequent high ductility of the alloys after welding and the large increase in hardness without cracking at hardening. The alloy can be welded on as a corrosion protective facing on the surfaces that come into contact with the environment in the internal combustion chamber of an engine. Furthermore, the high-temperature hardness is so high that the alloys according to the invention are very suitable as welded hardfacing alloys for valve seat areas.

In the above description, the components of the alloy according to the invention are all stated in percent by weight.

I claim:

1. A nickel-based facing alloy which, expressed in percentage by weight and apart from commonly occurring impurities, comprises from 40 to 51% Cr, from 0 to 0.1% C, less than 1.0% Si, from 0 to 5.0% Mn, less than 1.0% Mo, from 0.05 to less than 0.5% B, from 0 to 1.0% Al, from 0 to 1.5% Ti, from 0 to 0.2% Zr, from 0.5 to 3.0% Nb, an aggregate content of Co and Fe of maximum 5.0%, maximum 0.2% O, maximum 0.3% N and the balance Ni.

2. A nickel-based facing alloy as claimed in claim 1, wherein the content of Al is maximum 0.1%, and the content of Ti is maximum 0.1%.

3. A nickel-based facing alloy as claimed in claim 1, wherein the alloy contains from 45 to 50% Cr.

4. A nickel-based facing alloy as claimed in claim 1, wherein the alloy contains from 0.15 to 0.40% B.

5. A nickel-based facing alloy as claimed in claim 4, wherein the alloy contains maximum 0.25% B.

6. A nickel-based facing alloy as claimed in claim 1, wherein the alloy contains maximum 0.03% Si.

7. A nickel-based facing alloy as claimed in claim 1, wherein the alloy contains maximum 0.5% Mn.

8. A nickel-based facing alloy as claimed in claim 1, wherein the alloy contains maximum 0.5% Mo.

9. A nickel-based facing alloy as claimed in claim 1 wherein the alloy contains from 1.0 to 2.0% Nb.

10. A nickel-based facing alloy as claimed in claim 9 wherein the alloy contains maximum 0.02% Zr.

11. A nickel-based facing alloy as claimed in claim 1, wherein the aggregate content of Co and Fe of the alloy is maximum 1.0%.

12. A nickel-based facing alloy as claimed in claim 11, wherein the alloy contains maximum 0.02% O and 0.02% N.

13. A nickel-based facing alloy as claimed in claim 1, wherein the alloy is used for welding on to a cylinder member in a large two-stroke internal combustion engine.

14. A nickel-based facing alloy as claimed in claim 13, wherein the cylinder member is an exhaust valve.

15. A nickel-based facing alloy as claimed in claim 14, wherein said engine is a propulsion engine in a ship.

16. A nickel-based facing alloy as claimed in claim 14, wherein said engine is a stationary prime-mover.

17. A cylinder member selected from the group of a valve, a seat portion, a piston and a cylinder liner, in an internal combustion engine, particularly a large two-stroke crosshead engine, wherein the member is provided with a welded high-temperature corrosion-resistant facing alloy being at an operating temperature at normal running of the engine, said welded facing alloy having a hardness which has been increased by means of a precipitation hardening mechanism based on a solid-state phase transformation, the facing alloy having a temperature of activation of the precipitation hardening mechanism that is above the operating temperature of the alloy, and the precipitation hardening mechanism acting so slowly, that the alloy substantially has not hardened at welding on the cylinder member, but has hardened during a subsequent heat treatment at a temperature higher than the activation temperature for the precipitation hardening mechanism.

18. A cylinder member as claimed in claim 17, wherein the facing alloy has solidified on welding primarily in an austenitic phase ($\gamma$), part of which has become transformed into a ferritic phase ($\alpha$) at temperatures above the activation temperature for the precipitation hardening mechanism.

19. A cylinder member as claimed in claim 17, wherein the activation temperature for precipitation hardening of the alloy is in the interval from 550 to 1100° C., and wherein activation of the precipitation hardening mechanism requires said activation temperature to be exceeded for more than 40 s.

20. A cylinder member as claimed in claim 19, wherein the activation temperature for precipitation hardening of the alloy is in the interval from 700 to 850° C.

21. A cylinder member as claimed in claim 19, wherein activation of the precipitation hardening mechanism requires the activation temperature to be exceeded for more than 20 min.

22. A cylinder member, such as a valve, a seat portion, a piston or a cylinder liner, in an internal combustion engine, particularly a large two-stroke crosshead engine, wherein the member is provided with a welded high-temperature corrosion-resistant facing alloy, which facing alloy, expressed in percentage by weight and apart from commonly occurring impurities, comprises from 40 to 51% Cr, from 0 to 0.1% C, less than 1.0% Si, from 0 to 5.0% Mn, less than 1.0% Mo, from 0.05 to less than 0.5% B, from 0 to 1.0% Al, from 0 to 1.5% Ti, from 0 to 0.2% Zr, from 0.5 to 3.0% Nb, an aggregate content of Co and Fe of maximum 5.0%, maximum 0.2% O, maximum 0.3% N and the balance Ni.

* * * * *

UNITED STATES PATENT AND TRADEMARK OFFICE
CERTIFICATE OF CORRECTION

PATENT NO. : 5,958,332
DATED : September 28, 1999
INVENTOR(S) : Harro Andreas Hoeg It is certified that error appears in the above-identified patent and that said Letters Patent is hereby corrected as shown below:

<u>Title page,</u>
Please delete "[22] Filed: Jun. 11, 1997" and insert
-- [22] PCT Filed: Dec. 12, 1995
  [86] PCT No.: PCT/DK95/00503
      § 371 Date: Jun. 11, 1997
      § 102(e) Date: Jun. 11, 1997
  [87] PCT Pub. No.: WO 96/18747
      PCT Pub. Date: Jun. 20, 1996
  [30] Foreign Application Priority Data
      Dec. 13, 1994 [DK] Denmark.............1428/94

Signed and Sealed this

Eleventh Day of September, 2001

*Attest:*

*Attesting Officer*

NICHOLAS P. GODICI
*Acting Director of the United States Patent and Trademark Office*